Feb. 3, 1959     H. HARTEWIG ET AL     2,872,385
APPARATUS FOR THE REGULABLE CHARGING OF REGENERATORS
Filed Feb. 24, 1953     8 Sheets-Sheet 1
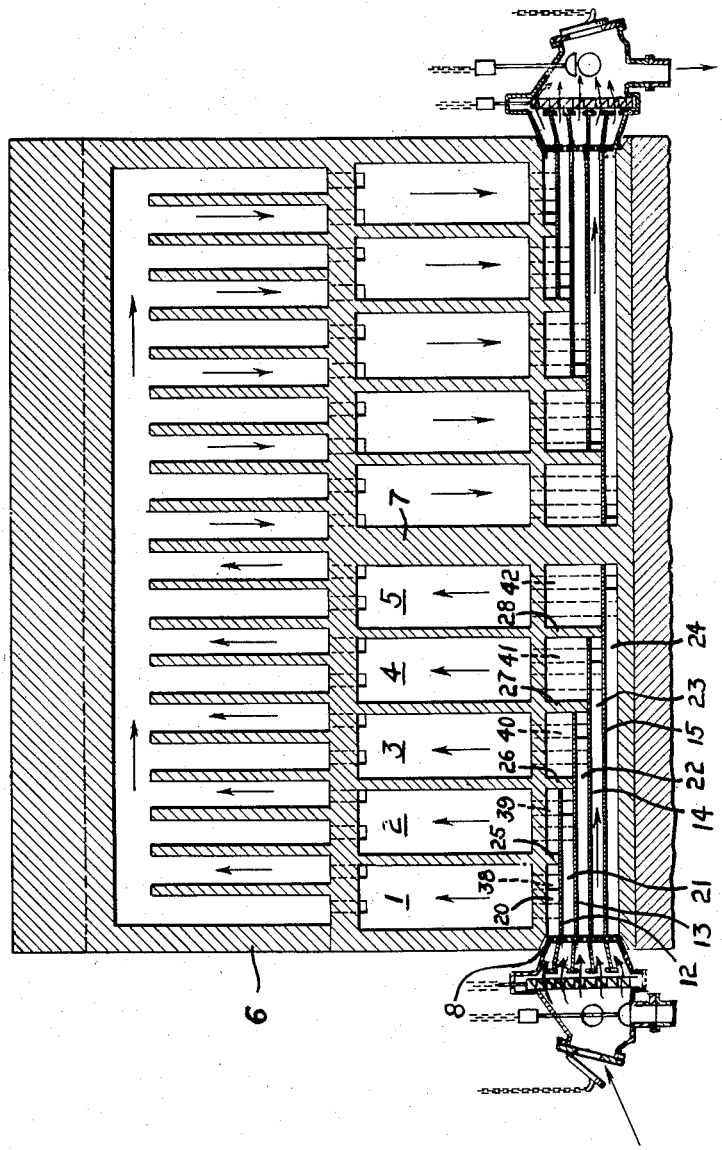
INVENTORS
Heinrich Hartewig, Arthur Steding
& Paul Eidel
BY Wenderoth, Lind & Ponack
ATTORNEYS

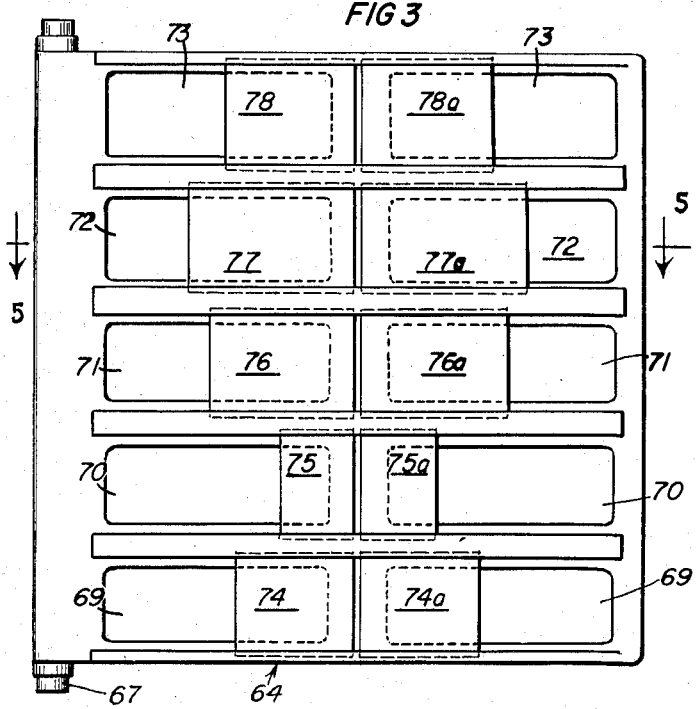
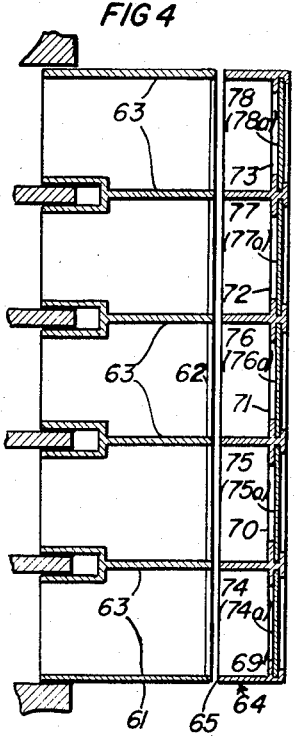
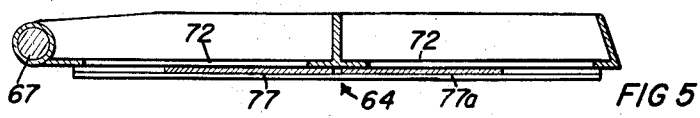
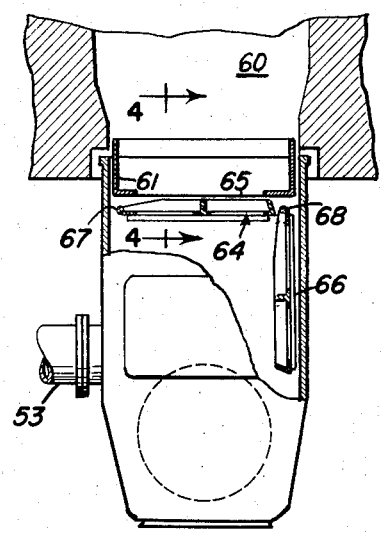

Feb. 3, 1959     H. HARTEWIG ET AL     2,872,385
APPARATUS FOR THE REGULABLE CHARGING OF REGENERATORS
Filed Feb. 24, 1953     8 Sheets-Sheet 3

INVENTORS
Heinrich Hartewig, Arthur Steding & Paul Eidel

BY Wenderoth, Lind and Ponack
ATTORNEYS

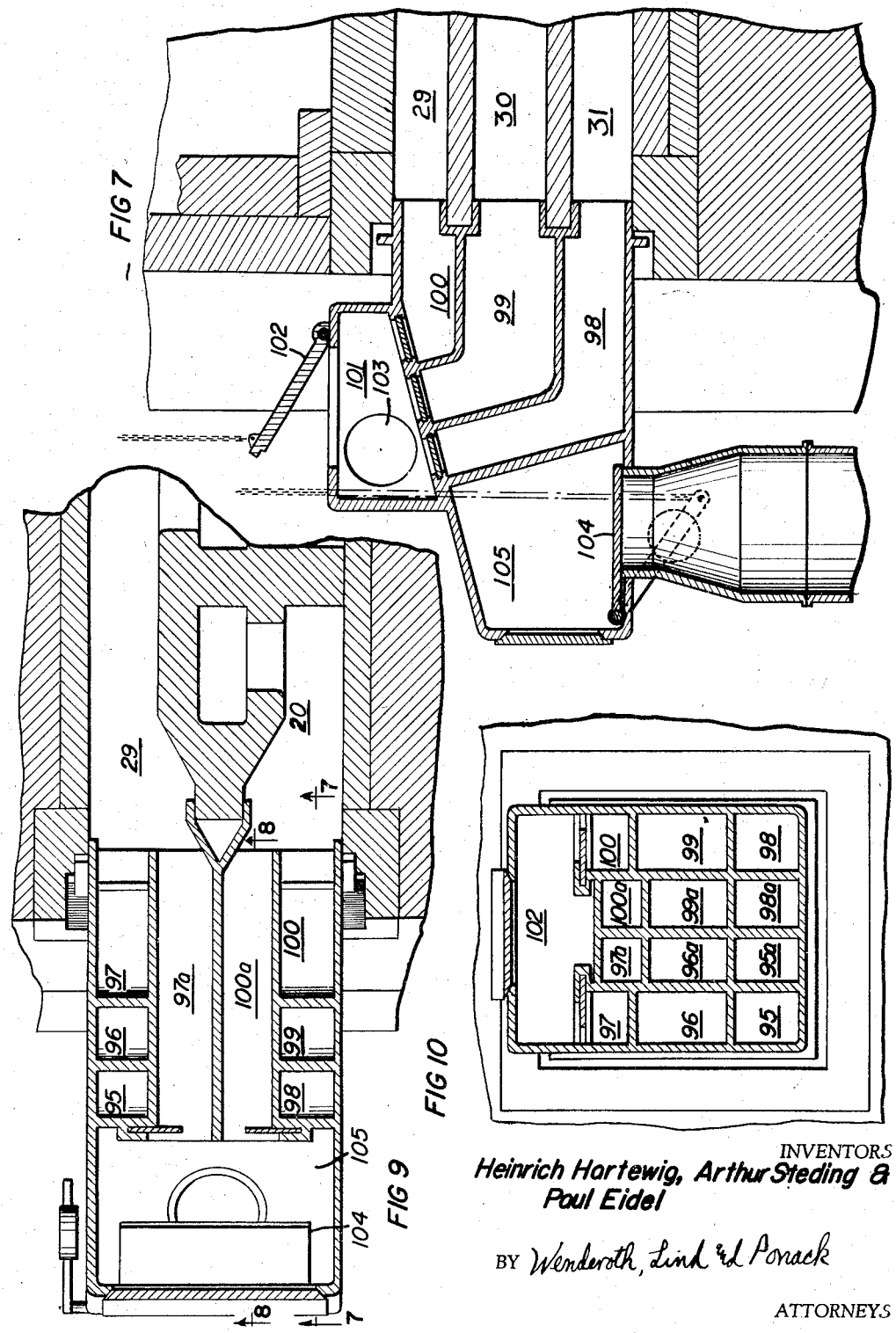

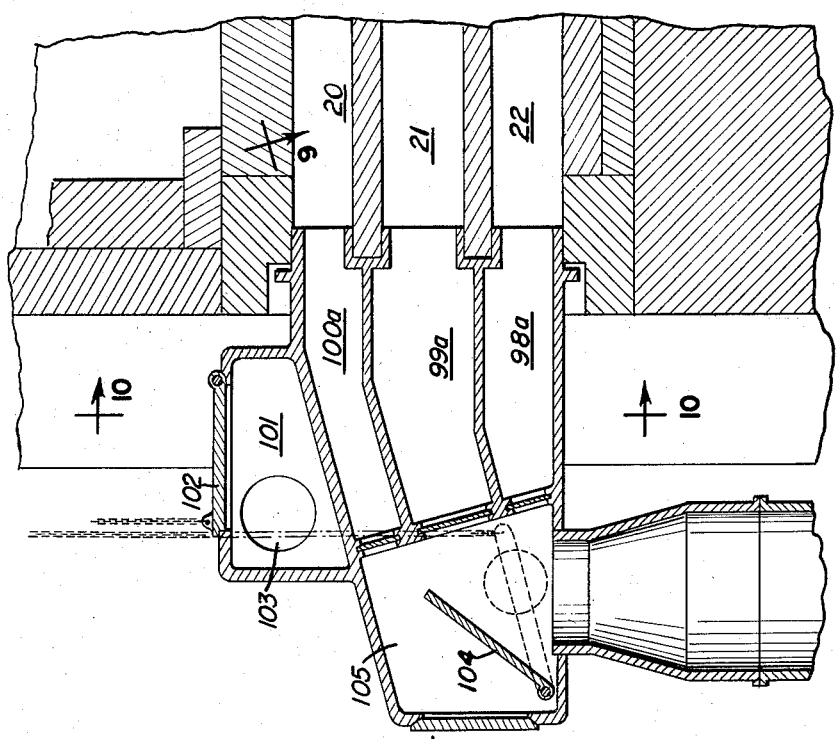
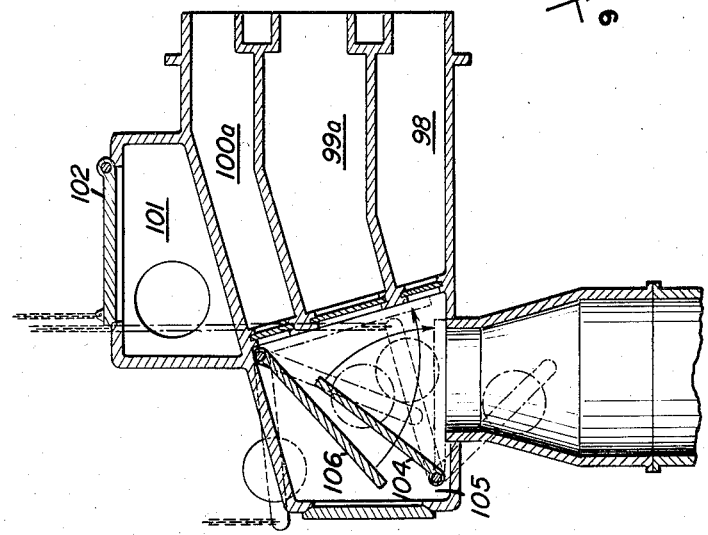

Feb. 3, 1959   H. HARTEWIG ET AL   2,872,385
APPARATUS FOR THE REGULABLE CHARGING OF REGENERATORS
Filed Feb. 24, 1953   8 Sheets-Sheet 8

INVENTORS
Heinrich Hartewig, Arthur Steding & Paul Eidel
BY Wenderoth, Lind & Ponack
ATTORNEYS

2,872,385

APPARATUS FOR THE REGULABLE CHARGING OF REGENERATORS

Heinrich Hartewig, Essen-Haarzopf, Arthur Steding, Bochum, and Paul Eidel, Essen, Germany, assignors to Didier-Kogag-Hinselmann, Koksofenbau und Gasverwertung, A. G., Essen, Germany, a German firm Application February 24, 1953, Serial No. 338,506

Claims priority, application Germany February 26, 1952

8 Claims. (Cl. 202—141)

In regenerators, it is of the greatest importance to regulate the flowing materials at the entry into the grid system and at their exit therefrom in such a way that the entire regenerator grid system is flooded by the flowing materials and that in consequence thereof the most favorable effect can be attained in the absorption of heat or in the delivery of heat. Special difficulties arise in the solving of this problem when single-chamber regenerators are of considerable extent in length or when long regenerators are subdivided and the resultant sections or cells are connected with the heat drafts or with a heat-draft group to which measured quantities of flowing materials are to be supplied or from which they are to be led away. Such regenerators are employed, for example, in horizontal coke ovens.

In such regenerators, the flowing materials are supplied to the grid system through bottom flues. There has heretofore been associated with the grid system a bottom flue, through which a combustion material is supplied and after the reversing of the flow of heating gas, waste gas is led away. Two bottom flues have also heretofore been arranged for one regenerator grid system. In that case only a combustion material—air or heating gas—flows in the one flue and only the waste gas flows away in the other flue. In the heating period the waste-gas bottom flue is quiescent; in the waste-gas period the bottom flue for air or heating gas is quiescent.

In the arrangement of two bottom flues, separately adjustable apertures with separate connection passages from the bottom flue to the grid system have been installed. In order to prevent transfers from the flue charged with flowing material into the quiescent flue, there have been arranged in the separation wall of the two flues, vertical flues which open at the bottom into the bottom flue in each case and discharge at the top into the grid-system chamber, as a result of which a flowing-over into the quiescent flue is avoided.

According to the present invention, the bottom flue is subdivided by means of partitions into a number of sections that are separate from one another, each of which extends from a regenerator section or a cell of the regenerator and up to the outer wall of the oven, and in connection with which there are installed, for each of these sections alone or for several jointly, shut-off members and/or dosing members for the materials flowing in or out. This arrangement can be employed not only for single-chamber regenerators, but also for regenerators which are subdivided into cells, and in connection with one-chambered as well as two-chambered bottom flues. As a result of this, it is possible to supply to the individual regenerator sections or the individual cells of a regenerator, dosed quantities of the heating materials, or to lead away the waste gas out of the sections or cells in dosed quantities. For example, it is thus possible to supply more air or heating gas to the regenerator sections or cells situated at the front wall of the oven than to those regenerator sections or cells situated toward the middle of the oven, or vice versa. Moreover, all parts of the regenerator can be charged uniformly. The same is true also for the waste gas. Since the supplying and leading-away of the flowing materials always involve only a comparatively small regenerator cross-section, the distribution over these cross-sections that takes place with the bottom-flue sections at any particular time is also uniform.

If, for example, the regenerator has five cells, five sections are formed also in the appurtenant bottom flue by the building-in of partitions. In the case of a one-chamber bottom flue there are then five sections, while in the case of a two-chamber bottom flue there are ten sections which are established in this way. The number of bottom-flue sections to be established is always in conformity with the number of the cells. The bottom-flue sections are shut off with respect to one another. But on the one hand they are connected with the appurtenant regenerator section or the appurtenant cell and, on the other hand, they terminate in or open into the reversing flues of the regenerator installation.

In the case of a two-chamber bottom flue, the bottom-flue sections are expediently connected with the grid-system chamber by means of flues situated in the vertical separating wall of the two bottom-flue chambers. The connecting flues that terminate at the top in the grid-system chamber have their lower openings connected at any particular time to one bottom-flue section of the two bottom-flue chambers. The connection to the two bottom-flue sections is expediently effected alternately in succession.

The closure of the openings of the sections of a bottom-flue chamber during its quiescence, which condition always prevails with two-chamber bottom flues during a reversal period, is effected in accordance with the invention by means of a movable plate which is expediently installed so as to be rotatable and which can be applied tightly against the openings of the sections of a bottom flue. This movable plate is applied tightly during the quiescence of this bottom-flue portion, but is lifted off when a material is flowing in the flue. This applying and lifting-off, i. e. closing and opening, which takes place in conformity with the times of reversal, is expediently carried out also in a positive manner by the reversing device of the regenerator reversing system. For this purpose, the cover plate is connected directly or indirectly with the reversing rod system of the waste-heat valve, so that the latter controls the movement of the plate. The plate itself may be a unipartite rotary flap valve, which is expediently fastened rotatably to a vertical side of the one bottom-flue chamber, or it may also be fashioned as a double flap valve whose closure is situated in the vertical middle of the one bottom-flue chamber.

In the case of a single-chamber bottom flue there are installed, at the openings of the bottom-flue sections, for the dosing of the inflowing and outflowing materials, two dosing plates which are expediently likewise fashioned as rotary flap valves, and which are applied alternately, in conformity with the times of reversal, in front of the openings of the bottom-flue sections. One flap valve is provided with means for dosing the inflowing materials, for example variously dimensioned apertures for each bottom-flue section, which correspond to the supplied quantity of material for the individual regenerator parts. The other flap valve has variously dimensioned apertures for each bottom-flue section which correspond to the quantity of material that is led away. In this manner not only the supplied, but also the withdrawn quantities of material are dosed exactly for each individual regenerator part. In a further development, the fixed apertures for the bottom-flue sections may be replaced by adjustable apertures, for instance apertures with projecting slide valves. As a result thereof, it becomes possible to take account quickly of changed flow conditions, for example in case of a change in the composition of the heating gas.

If the single plate covering the entire bottom-flue opening is unduly large and heavy and in consequence thereof its actuation by the rod system of the reversing valve requires a considerable expenditure of power, as well as if the considerable width of this plate requires a very powerful axle suspension to prevent a displacement of the closure and leakages arising in consequence thereof, the bottom-flue opening may be subdivided into two apertures and each aperture may be provided with two cover plates prefixed alternately, of which the one plate is provided with the adjustable dosing apertures for the inflowing combustion materials and the other plate with the adjustable dosing apertures for the waste gases. Fundamentally the two dosing plates for the inflowing materials are identical with one another, as are also the two dosing plates for the outflowing waste gases. Two plates are always opened or closed simultaneously by the rod system of the reversing valve. In other respects the functions of two such plates are identical with those of one plate.

The dosing devices, such as the flap valves, are expediently connected directly or indirectly with the reversing rod system of the waste-heat valve in such a way that a positive pre-opening and closing of the flap valve takes place in conformity with the reversals of operation of the generator. This automatic arrangement insures a positive opening and closing of the flap valves.

In accordance with the invention, the covering and dosing members are further built into a common frame which is located in front of the openings of the bottom-flue sections, the building-in of the frame between the bottom-flue opening and the reversing valve being effected in such a way that the frame is easily interchangeable and is situated as closely as possible to the bottom-flue opening at the front wall of the oven. Repairs and alterations on the dosing and covering plates can consequently be accomplished rapidly and easily.

An expedient further development, in accordance with the invention, involves the association of two sections with each opening of the individual bottom-flue sections that is situated toward the outer wall of the oven, one of which sections serves for the supply of material and the other one of which serves for the withdrawal of material, the sections for the supply of material (heating gas or air) and those for the withdrawal of material (waste gas) being each connected to a common supply chamber or to a common waste gas withdrawal chamber, respectively. Each opening of the two sections that is situated toward this supply chamber or withdrawal chamber is provided with a dosing member, for instance a slide valve, a flap valve, an insert, or the like by which the quantity of the materials (heating gas or air) to be supplied to the individual regenerator cells as well as of the waste gases to be led away from these cells can be determined. The single opening can also be provided simultaneously with several such dosing members, for instance with an insert in the form of a guide vane and with a slide valve regulating the quantity that passes through. The adjustment of the individual dosing members that has once been made for operation of the oven in this arrangement can in this connection be retained constant regardless of the change of draft of the oven.

The advantage of the two-fold opening of each bottom-flue section lies in the fact that the sections carrying the dosing members do not need to be moved in case of change of draft, and that such change of draft can be realized solely with the aid of the valves of the supply flues or discharge flues opening into the common supply chamber or into the common waste gas withdrawal chamber, respectively. These valves are connected in conventional manner to the reversing rod system of the oven.

In order positively to avoid, during the period of the supply of heating gas or air, e. g. in case of a closed waste-gas valve, any short-circuit between the waste-gas flue and the supply of heating gas or air, there may be additionally arranged in the chamber for the withdrawal of waste gas, a cover plate which covers over all the openings of the waste-gas flue and is, for example, supported so as to be swingable. This cover plate, in the same way as the reversing valves, may be connected to the reversing rod system of the oven.

For supplying or leading-away the quantities of material, dosed by the apparatus in accordance with the invention for the individual regenerator cells, the flue cross-sections of superimposed bottom-flue sections, inclusive of their respective two orifice sections, are expediently differentially proportioned.

The swingable cover plates, which are actuated in the interior of a casing, must in consequence of their unilateral support be of very strong construction and require for their actuation a long, powerful rod system from the reversing device, as well as also a great expenditure of power. Even slight displacements in the masonry can bring about jammings which are then difficult to eliminate.

In accordance with the present invention, the cover plate preferably takes the form of a single slide valve which contains the dosing apertures not only for the inflowing material, but also for the outflowing material. In this connection the slide valve may be constructed as a flat slide valve or as a rotary slide valve. The dosing apertures are arranged next to one another in such a way that in case of a displacement or turning of the slide valve, one set or the other set of dosing apertures is alternately situated in front of the sections of the bottom flue.

The advantage is thus realized that the reversals which take place periodically at any particular time are effected by means of a simple lengthwise or rotary movement of a slide valve, the requisite moving power being applied from the exterior, and that the connection, necessary for the purpose of simultaneous reversal, with the reversing valve is established in a simple manner without a long rod system.

The drawings illustrate the invention, in partly diagrammatic manner, by means of presently-preferred exemplary embodiments thereof.

Fig. 1 shows a longitudinal section through a two-chamber bottom flue with a superimposed regenerator grid system.

Fig. 2 is a horizontal section through a single-chamber bottom flue section.

Fig. 3 is a front view of a detail according to the invention, and Figs. 4 and 5 are corresponding vertical and horizontal sectional views, respectively being taken on section lines 4—4 and 5—5.

Figure 6:
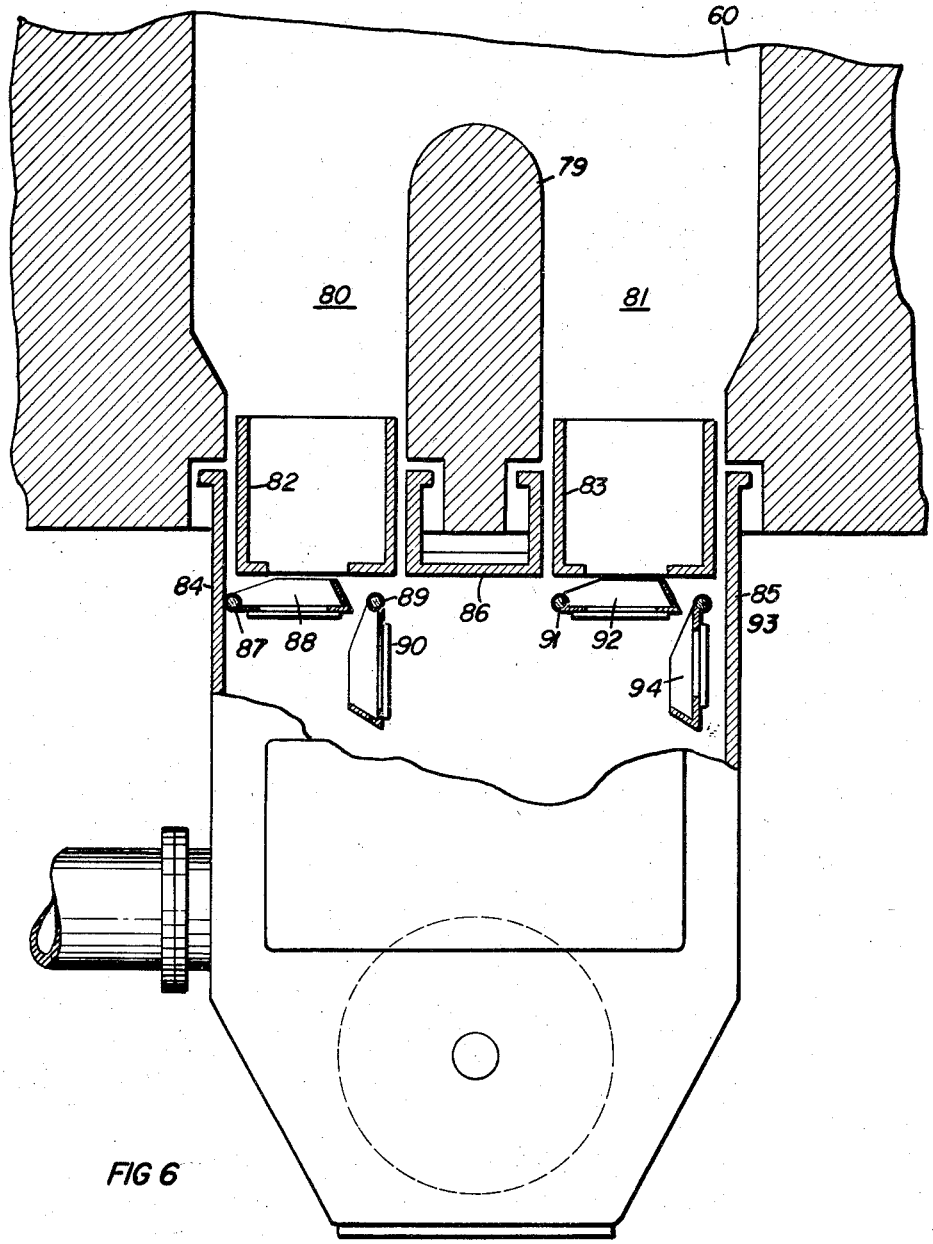

Fig. 6 is a horizontal section through a one-chamber bottom flue having a divided opening and two plates in front of each of the two orifices.

Figs. 7 to 11 show details of the supplying and discharge or withdrawal flues for the heating agents in the case of an embodiment having three regenerator sections in place of the five regenerator sections illustrated in Fig. 1, and correspondingly having three supply and withdrawal flues.

Fig. 7 is a vertical longitudinal section along line 7—7 of Fig. 9; Fig. 8 is a vertical longitudinal section along line 8—8 of Fig. 9; Fig. 9, Fig. 11 is a horizontal section along line 9—9 of Fig. 8; Fig. 10 is a vertical transverse section along line 10—10 of Fig. 8; and Fig. 11 shown a modification of the structure according to Fig. 8.

Figs. 12–17 are illustrations of further details for the regulation of the supplying and withdrawal flues for the heating material in the case of a one-chamber bottom flue.

Figure 12:
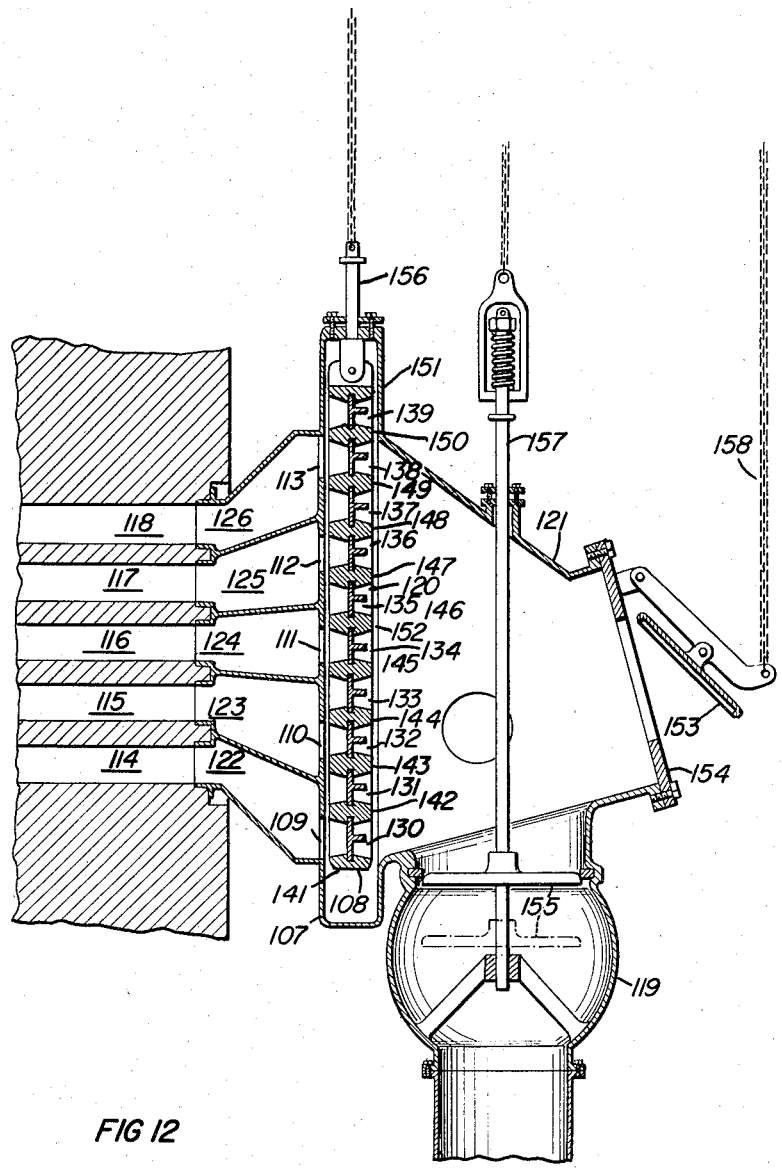
Figure 13:
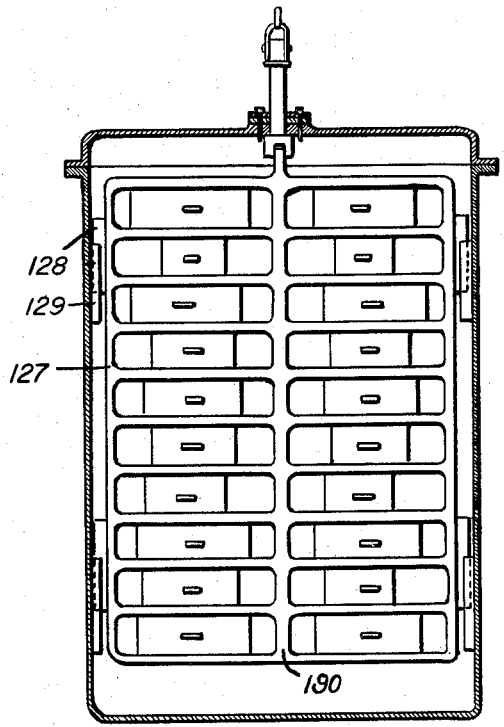
Figure 14:
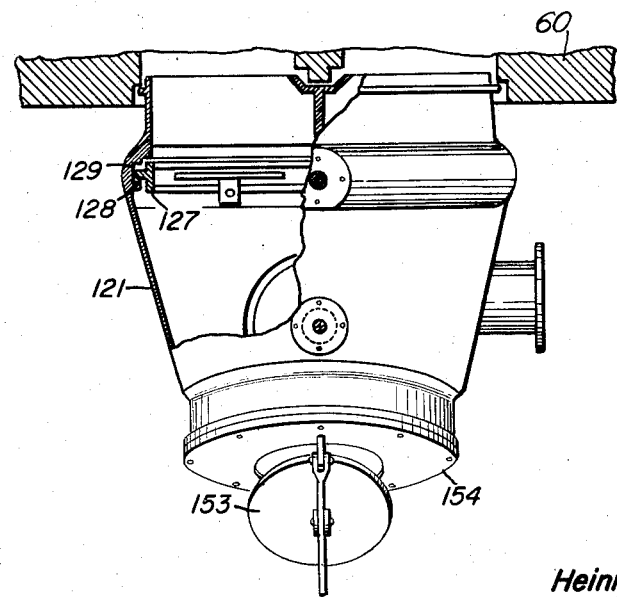
Figure 16:
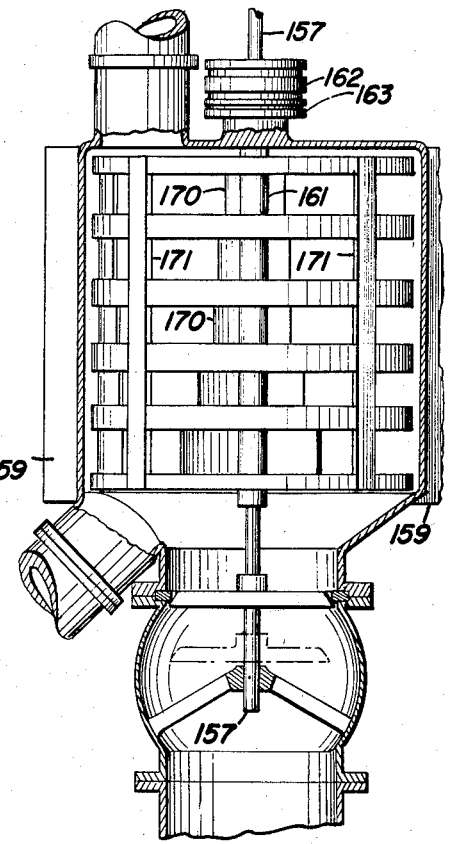
Figure 15:
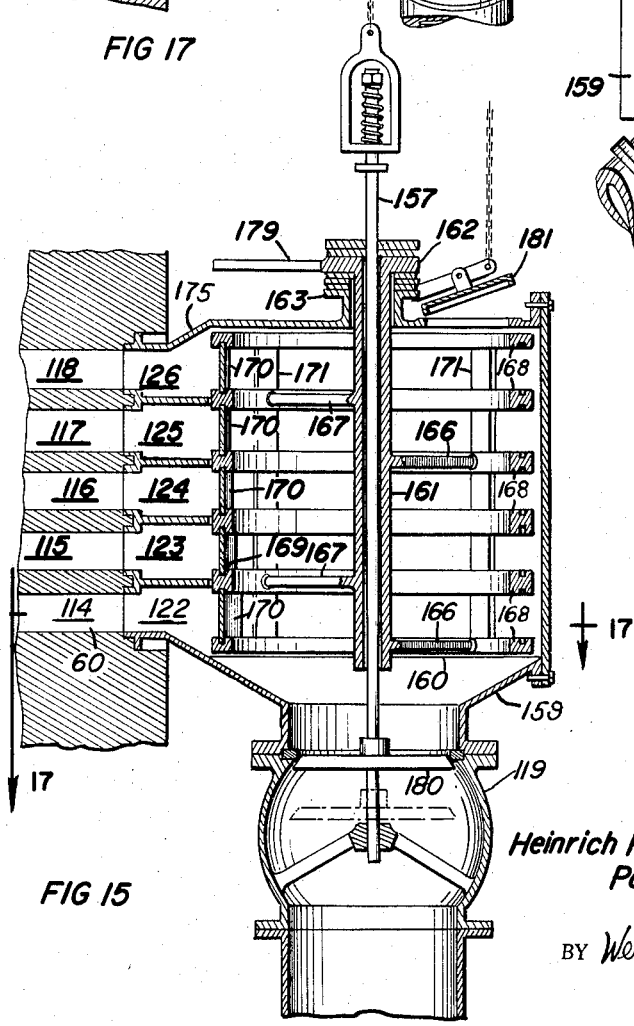

Fig. 12 shows an upright flat slide valve in vertical cross-section,

Fig. 13 shows the same flat slide valve in front view,

Fig. 14 shows the same flat side valve in horizontal section,

Fig. 15 shows an upright rotary slide valve in vertical section,

Fig. 16 shows the same rotary slide valve in front view, and

Figure 17:
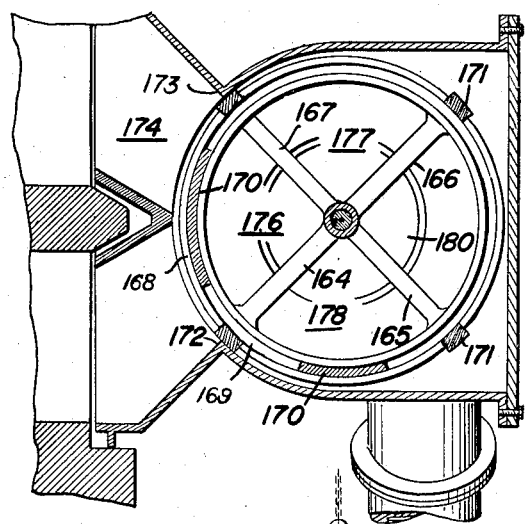

Fig. 17 shows the same rotary slide valve in horizontal section.

In Fig. 1, reference numerals 1 to 5 designate the regenerator cells on one side of the oven, the construction of the other side being a mirror image, cell 1 being situated adjacent the outside wall 6 of a coke oven, the cell 5 adjacent the central wall 7 of the oven, with cells 2, 3 and 4 intermediately situated, as shown; 8 is the bottom flue, by which the entire space situated below the regenerator grid system is to be understood. In the form shown in the figures, this space is here fashioned into a two-chamber bottom flue, but it may be a single chamber bottom flue. Each of the two bottom-flue chambers is divided by horizontal partitions 12, 13, 14, 15 into five sections 20, 21, 22, 23, 24, the sections being in each of the two bottom flue chambers, which sections are separated from one another by separating walls 25, 26, 27, 28. Each of these sections 20 to 24 is in connection with the appurtenant cell space. The uppermost section 20 is connected by the connection flue 38 situated in the separating wall between the chambers of the bottom flue with the space of the cell 1. The section 21 is in connection with the cell space 2 by way of the connection flue 39, etc., 22 by 40 with 3, 23 by 41 with 4, 24 by 42 with 5, and on the other hand likewise the sections of the other bottom-flue chamber by way of the appurtenant connection flues situated in the separating wall with the cell spaces 1 to 5. The heating agent air, for example, flows through the section 20 and the connection flue 38 into the generator cell 1; vice versa the waste gas flows out of the regenerator cell 1 through the connection flue 43 into the section 29. In the same manner air or gas and waste gas flow into or out of the cell spaces 2 to 5.

The regenerator cells shown in Fig. 1 are positioned on one side of a coking oven, and on the other side of the oven is a similar assembly. In the operation of the coking oven, air and combustion gases are fed first through the regenerator assembly into the coking oven and the products of combustion are passed out through the other regenerator assembly thus heating the bricks in the regenerator cells. After the flow has proceeded in this direction for a predetermined period of time, it is reversed, and the air and combustion gases are passed into the coke oven through the regenerator assembly the regenerator cells of which have been heated, then through the coke oven, and the products of combustion passed out through the first regenerator assembly heating the bricks in the regenerator cells thereof. The heat accumulated in the bricks of the regenerator cells is thus transferred to the incoming gases and the heat in the products of combustion gases is transferred to the bricks in the regenerator cells.

Fig. 2 shows a one-chamber bottom flue 60, which, as can be seen from Figs. 3 and 4, is subdivided into 5 sections. With these there is associated the frame 61, which on its front side 62, inclusive of the partitions 63, is fashioned in such a way that the cover plate 64 together with its flat junction side 65 can apply in tight fashion against the front side 62 of the frame and against the partitions 63. Two such cover plates 64 and 66 are installed, which are in each case supported rotatably on axles 67, 68. These axles 67, 68 are coupled in a positive manner, in a way that is not illustrated, with the rod system of the valve reversal. The cover plates 64, 66 have dosing apertures 69 to 73, namely two for each section, i. e. one plate for the inflowing material, for example 64, and the other one for the outflowing waste gases, for example 66. The dosing apertures 69 to 73 can be adjusted regulably by means of slide valves 74 to 78 and 74a to 78a (Fig. 6).

In operation the dosing device illustrated in Figs. 2 through 5 is positioned as shown in Fig. 2 during the passage of air and combustion gases into the regenerator chambers 1 through 5 of Fig. 1. The sizes of the apertures 69 through 73 in the cover plate 64 are adjusted to obtain an even flow of gases into the bottom flue 60. The size of the various apertures depends upon the flow conditions which must prevail at the various points in the bottom flue, and may vary for different regenerator assemblies. When the flow through the coking oven is reversed, the cover plate 64 is swung back away from in front of the bottom flue, and the plate 66 having similar apertures, but of different sizes to accommodate the different volume of waste gases coming from the regenerator chambers is swung into place over the opening of the bottom flue 60. By adjustment of the slides covering the apertures in the cover plate 66, the flow of the waste gases from the regenerator is controlled. A similar arrangement is provided on the regenerator assembly on the other side of the coke oven, the cover slides being used in the reversed order in that arrangement.

Fig. 6 illustrates a representative embodiment of the invention, in which the flue opening of the one-chamber bottom flue is subdivided into two sections, which have movable cover plates that operate uniformly and have a shutting-off action, with dosing members for the inflowing or outflowing materials. The one-chamber bottom flue 60 is subdivided at its opening by the masonry body 79 into two apertures 80 and 81. In each aperture 80 and 81 there is situated a frame 82 and 83 respectively. 84, 85, 86 are the attachments for the reversing valve. On one axle 87 there is rotatably mounted the cover plate 88. On the other axle 89, situated opposite this one, there is located, likewise rotatably mounted, the cover plate 90. These two dosing plates serve for closure of the partial aperture 80 of the bottom flue 60 over its entire height. For closure of the partial aperture 81 there are installed the cover plate 92, rotatably supported on the axle 91, and the cover plate 94, supported in the same way on the axle 93.

If, for example, the cover plates 88 and 92 serve for the inflowing material, they are provided with the gradations in the dosing apertures which correspond to the inflow of the combustion agent into the individual sections of the bottom flue. The cover plates 90 and 94 are intended for the dosing or controlling of the waste gas withdrawal, and they likewise are provided with suitable gradations of the dosing apertures for the waste gas for the individual sections of the bottom flue 60.

The cover plates 88, 90, 92 and 94 are used in the same manner as the cover plates 64 and 66 of Fig. 2. Cover plates 88 and 92 are swung over the openings 80 and 81 to the bottom flue 60 to control intake of air and combustion of gases, while the cover plates 90 and 94 are swung into position during the flow of waste gases from the openings 80 and 81 of the bottom flue 60.

Figs. 7 to 11 show the arrangement, in accordance with the invention, of the connection of each bottom-flue section to the supply flue for the fuel gas and the lead-away flue for waste gas.

The longitudinal section according to Fig. 7 is a continuation of the longitudinal section of a two chamber bottom flue similar to Fig. 1, at the outer wall 6 of the oven, the two chambers each being divided into three sections. Accordingly the bottom-flue sections 29, 30, 31 respectively are shown in Fig. 7. The device in accordance with the invention is associated with the opening of these sections which are situated at the outer wall 6 of the oven. In this device, each bottom-flue section 29, 30, 31 is in each case associated with two sections 95 to 100 and 95a to 100a. Of these, the sections 95 to 97 and 98 to 100 serve for the supplying of material (heating gas or air), the sections 95a to 97a and 98a to 100a for the leading-away or withdrawal of waste gas. The sections 95 to 97 for supplying of material terminate in the common material-supply chamber 101, which is at the same time also a material-distribution chamber for the material-supply sections. The chamber 101 can optionally serve, with the aid of the flap valve 102, for supplying combustion air, and with the aid of the input line 103, for supplying heating gas.

While, during a heating period, the bottom flue or all of its sections operate as a material-supply flue, after the change of draft the same bottom flue or the same sections are employed for the leading-away of waste gas. At the switching-over of the direction of flow, in the device in accordance with the invention, the air flap valve 102 or the heating-gas feed line 103 is closed, and the waste-gas valve 104, which has until then been kept closed, is opened to the waste-gas line. For leading away the waste gases which now flow out of the bottom-flue sections 29 to 31, there serve the sections 95a to 100a, which open into the common waste-gas collecting chamber 105.

The openings of the material-supply sections 95 to 100 and those of the waste-gas withdrawal sections 95a to 100a are provided with dosing members in the form of slide valves, which make it possible to determine the quantity of material to be supplied for each regenerator cell or the quantity of waste gas to be led away from each such cell. The material-supply sections 95 to 100 and the waste-gas lead-away sections 95a to 100a inclusive of their dosing members are in this connection firmly built in and are not subject to movement of any kind in case of change of draft. The switching-over of the draft is effected solely by actuation of the reversing valves 102 or 103 and 104. The valves 102, 103, and 104 are in this arrangement connected in any suitable and conventional manner to the reversing rod system of the oven.

Fig. 11 shows a cover plate 106, which may additionally be installed by way of precaution in the waste-gas collecting chamber 105, for the covering of all the waste-gas lead-away sections 95a to 100a which open into the said collecting chamber. The cover plate 106 also is expediently connected to the reversing rod system of the oven.

The differential proportioning of the cross-sections of superimposed bottom-flue sections is also shown in Figs. 7 and 8.

Turning now to Figs. 12 to 17—

The flat slide valve according to Figs. 12 to 14 consists essentially of a slide-valve frame 107 in which the slide-valve plate 108 is moved by raising or lowering. The frame 107 has on its side situated toward the one-chamber bottom flue 60 as many inflow apertures 109 to 113 as there are individual flues 114 to 118 present in the bottom flue. The side of the slide-valve frame 107 that is situated toward the reversing valve 119 has a large aperture 120, with which the hood 121 is associated. The frame apertures 109 to 113 are connected by connecting pipe sections 122 to 126 to the individual flues 114 to 118 of the bottom flue 60.

The slide-valve plate 108 consists of the frame part 127, which laterally carries a lug 128 that moves in the groove 129 of the slide-frame 107. The frame part 127 has passage apertures 130 to 139, which are arranged above one another. Each passage aperture is adjustable by means of a slide-valve plate 140 which is displaceable in grooves of the crosspieces 141 to 151. Each slide valve plate 140 is provided with a handle 152 for actuation thereof.

The distribution, disposition or arrangement of the slide-valve frame apertures 109 to 113 is such that always one of the passage apertures 130 to 139 of the slide-valve plate 108 is situated in front of one of the slide-valve frame apertures 109 to 113, and that, alternately, either only the apertures 130, 132, 134, 136, 138 or, after the lowering of the slide-valve plate 108, the apertures 131, 133, 135, 137, and 139. The combustion materials, for example, flow in through the one group of slide-valve passage apertures, for instance 130, 132, 134, 136, and 138, while the combustion gases are discharged through the other group 131, 133, 135, 137, 139 when the slide valves occupies a different position.

The hood 121 carries the air flap valve 153, which rests upon the frame 154 in the closed position. At the lower end of the hood 121 there is situated the reversing valve 119 with the valve plate 155. This valve and the slide-valve plate 108 are connected with one another by way of the slide-valve rod 156 of the slide-valve plate 108 and by way of the valve rod 157 of the reversing valve 119, in such manner that a positive change in position of the slide-valve plate 108 occurs when the valve 119 is opened or closed. At the same time the air flap valve 153 is connected by the chain pull 158 to the said means, as that this valve 153 is thereby also positively opened or closed, as the valve 119 is closed or opened. According to Fig. 12, when the valve 119 is closed, combustion air flows into the individual flues 114 to 118 of the bottom flue 60 through the opened flap valve 153, through the passage apertures 130, 132, 134, 136, 138 of the slide-valve plate 108, and through the frame apertures 109 to 113, after passage through the connection pipe-sections 122 to 126.

When the flow of gases through the coke oven is reversed, the slide valve plate 108 is lowered to present the set of apertures 131, 133, 135, 137 and 139 to the openings 109 through 113. At the same time, by the connection of the valve rod 157, the reversing valve 119 is opened, and by the chain 158 the flap valve 153 is closed. The exhaust gases then pass from the sections 114 through 118 of the bottom flue 60 out through the apertures in the slide valve plate and out through the valve 119.

The spring 128 of the slide-valve plate 108 does not need to extend over the entire height of the slide-valve plate. It suffices if, as illustrated in Fig. 13, it extends only over the length of travel of the slide-valve movement. Expediently, guides are installed only at the upper and at the lower end of the slide-valve plate.

In the case of wide bottom flues, the outlet aperture can be subdivided, in order that covering thereof may be accomplished more easily. The slide valve, however, even in this case extends over the entire width of the bottom flue.

In Fig. 13 there are illustrated by way of example the dosings for the individual flues with respect to the inflowing combustion materials, for example air, and for the outflowing waste gas. The slide valve 107 is built with two panels for each passage aperture 130 to 139. As a result of this subdivision it is possible to stiffen the frame part of the slide valve 107 by means of a central rib 190 and to mount and move it easily.

The rotary slide valve illustrated in Figs. 15 to 17 consists of the casing 159 and the slide valve 160 that rotates therein after the manner of a drum. The reversing valve 119 is again installed at the lower end of the casing 159. The valve rod 157 passes through the casing 159. Around the valve rod 157 there is arranged a vertical hollow shaft 161, which by means of flanges 162 rests tightly upon a cylindrical extension 163 of the casing. On the hollow shaft 161, there are mounted stagewise above one another arms 164 to 167, which carry annular members 168. The latter are provided with grooves 169 in which the metallic dosing sheets 170 are movably inserted. The members 168 are provided, at the points where they are carried by the arms 164 to 167, with a sealing strip 171 extending over the entire height, which strips are applied tightly against the edges 172, 173 of the inlet opening 174 of the casing 159.

As many ring pieces are installed as are necessary for the forming of passage apertures, each individual flue 114 to 118 of the bottom flue 69 also having a passage aperture of its own in the rotary slide valve.

The connection of the casing 159 to the individual flues is effected by means of a pipe-section 175, which is subdivided in conformity to the number of individual flues. The annular members 168 bear tightly against these subdivisions.

Fig. 17 shows a rotary slide valve which can be switched over to inflowing or outflowing materials by means of a 90° turn. For this purpose the connection pipe-section 175 is arranged close to the casing 159 except for one-quarter of the circumference of the rotary slide valve. When the arms, for example 167 and 166, and the appurtenant sealing strips 171 are situated at the casing edge 173, the apertures formed by the stages are for the time being connected to the individual flues over the length of a quadrant. The sheet metal slide-valve members arranged in the grooves 169, for the dosing of the inflowing and outflowing gases, bear tightly against the sealing strip 171 and continue to bear tightly against the latter as they are moved. Now if, for example, the quadrant 176 is used for the inflowing combustion air, the sheet metal dosing members of all quadrants 176 situated vertically above one another are set in accordance with requirements. Then the quadrant 177 or 178 must be used for the outflowing gases, and the inlets of all superimposed corresponding quadrants must then correspondingly be opened partly or entirely by displacement of the sheet metal dosing members 170. An arm 179, which is connected with the reversing device of the outlet valve 180 or with the air flap valve 181, assures the positive turning of the slide valve to the extent of 90° each time, after the switching-over of the valve 119.

The rotation of the slide valve is accomplished at the time the flow of gases through the coke oven is reversed, and the effect is the same as in the operation of the preceding modifications. Similarly, an identical device is provided for the regenerator chambers on the other side of the coke oven and the apertures presented to the bottom flue are used in the reversed order to those of the dosing device just described.

The rotary slide valve can also be arranged for a rotation of 180°.

Having thus disclosed the invention, what is claimed is:

1. In a regenerator for industrial furnaces having a plurality of cells and a bottom flue extending over the length of said regenerator to an outside wall thereof, the bottom flue having a plurality of sections and each section being connected with one of said cells through an aperture in said cell, the improvement comprising an apparatus for the regulable charging of the regenerator, said apparatus comprising at least one dosing member having a plurality of sets of dosing apertures therein of different sizes, said dosing member being positionable over the end of the bottom flue and the sections therein in sealing engagement with the outside wall of the regenerator, said dosing member comprising means for first placing one of said plurality of sets of dosing apertures in communication with the end of said bottom flue and then placing another of said plurality of sets of dosing apertures in communication with the end of said bottom flue.

2. An apparatus as claimed in claim 1 in which said dosing member comprises a pair of dosing flap valves, one of which has one set of apertures therein of a size for the dosing of the inflowing materials and the other of which has another set of apertures therein of a size for the dosing of outflowing materials, and said means comprising pivotal mountings on either side of the bottom flue on which said dosing flap valves are mounted, whereby they can be caused to bear against the openings of said bottom flue sections alternately.

3. An apparatus as claimed in claim 2 in which said flap valves have a plurality of sliding cover plates thereon for covering the apertures therein.

4. An apparatus as claimed in claim 1 in which said dosing member comprises a pair of conducting sections for each of the sections of said bottom flue, a common supply chamber to which one of each pair of conducting sections leads forming one set of apertures, and a common leading away chamber to which the other of each pair of conducting section leads forming another set of apertures, and said means comprises said supply chamber and said leading away chamber, said valve means on said supply chamber being open when said valve means on said leading away chamber is closed, and said valve means on said supply chamber being closed when said valve means on said leading away chamber is closed.

5. An apparatus as claimed in claim 4 in which said leading away chamber has swingably mounted therein a cover plate swingable to cover all of the conducting sections leading into said chamber.

6. An apparatus as claimed in claim 1 in which said dosing member comprises a housing having a plurality of sections mounted adjacent the ends of the section of said bottom flue, the sections of said housing corresponding with the sections of the bottom flue, a slide valve slidably mounted on said housing for covering the sections in said housing and having said plurality of sets of dosing apertures therein, a plurality of cover plates slidably mounted on said slide valve and slidable over said dosing apertures, and said means comprising means for moving said slide valve for positioning a portion of said dosing apertures to regulate inflowing materials to the flue sections in one position and to position the dosing apertures to regulate outgoing materials from the flue sections in the other position.

7. An apparatus as claimed in claim 6 and a supply valve in said housing and a waste heat valve in said housing, said supply valve and said waste heat valve being on the opposite side of said slide valve from said sections, and means connecting said slide valve, said supply valve and said waste heat valve for opening said waste heat valve and closing said supply valve when said slide valve is moved from the position in which said apertures for dosing inflowing material are in the operative position to the position in which the apertures for dosing the outgoing material are in the operative position.

8. An apparatus as claimed in claim 1 in which said dosing member comprises a cylindrical housing having an extension thereon, said extension containing a plurality of material conducting passages corresponding to the chambers of said bottom flue sections, a shaft rotatably mounted in said housing, a plurality of circular frames mounted on said shaft, said frames sliding tightly against the ends of said material conducting passages, a plurality of dosing members slidably mounted along the periphery of said circular frame and defining between them said dosing apertures, whereby on rotation of said shaft and said circular frames said apertures are presented to the ends of the material conducting passages, and a supply valve and a waste heat valve in said housing.

References Cited in the file of this patent

UNITED STATES PATENTS

| 1,212,866 | Wilputte | Jan. 16, 1917 |
| 1,522,421 | Crossen | Jan. 6, 1925 |
| 1,676,736 | Kus | July 10, 1928 |
| 1,775,856 | Hauser | Sept. 16, 1930 |
| 1,961,265 | Van Ackeren | June 5, 1934 |
| 2,334,612 | Davis | Nov. 16, 1943 |
| 2,486,087 | Wright | Oct. 25, 1949 |

FOREIGN PATENTS

| 183,804 | Germany | Apr. 18, 1907 |
| 489,125 | Germany | Aug. 4, 1931 |
| 399,975 | Great Britain | Oct. 19, 1933 |